United States Patent
Kulas et al.

(10) Patent No.: US 8,442,733 B2
(45) Date of Patent: May 14, 2013

(54) METHOD FOR DETECTING THE PERFORMANCE OF A SKIP SHIFT DEVICE

(75) Inventors: Richard A. Kulas, Dexter, MI (US); Steve Wante, Lakeland, MI (US); Joel D. Ball, Ann Arbor, MI (US); Gregory L. Ohl, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1326 days.

(21) Appl. No.: 12/143,222

(22) Filed: Jun. 20, 2008

(65) Prior Publication Data

US 2009/0319145 A1 Dec. 24, 2009

(51) Int. Cl.
*G06F 7/00* (2006.01)
(52) U.S. Cl.
USPC .............................................. 701/62; 74/335
(58) Field of Classification Search ............ 701/62; 74/335
See application file for complete search history.

(56) References Cited

U.S. PATENT DOCUMENTS

| | | | | |
|---|---|---|---|---|
| 5,809,835 A * | 9/1998 | Beim et al. | ...................... | 74/335 |
| 5,951,439 A * | 9/1999 | Jang | .............................. | 477/133 |
| 6,145,398 A * | 11/2000 | Bansbach et al. | ............... | 74/335 |
| 6,151,543 A * | 11/2000 | McKee et al. | ................... | 701/55 |
| 6,520,039 B2 * | 2/2003 | Ogami et al. | ................... | 74/335 |
| 2001/0025536 A1* | 10/2001 | Nishimura | ...................... | 74/335 |
| 2007/0137335 A1* | 6/2007 | Lee | .............................. | 74/329 |

\* cited by examiner

*Primary Examiner* — Thomas Black
*Assistant Examiner* — Shardul Patel
(74) *Attorney, Agent, or Firm* — Ralph Edwin Smith

(57) ABSTRACT

A skip shift device performance detecting method used to more accurately enable skip shift diagnostic execution in a manual transmission equipped vehicle where a skip shift has been requested and a transmission clutch remains engaged. Where a skip shift request ceases during clutch engagement, a timed loop is used to monitor if clutch disengagement occurs before the loop times out. Where clutch disengagement occurs before the loop times out, skip shift diagnostic execution is enabled. Where the loop times out before disengagement, skip shift diagnostic execution is disabled. Where the skip shift is requested and the clutch remains engaged, the skip shift request is monitored to determine whether it is withdrawn before clutch disengagement. If it is withdrawn before clutch disengagement, the aforementioned timed monitoring loop is executed. If it is not withdrawn before clutch disengagement, execution of the skip shift diagnostic is enabled.

21 Claims, 4 Drawing Sheets

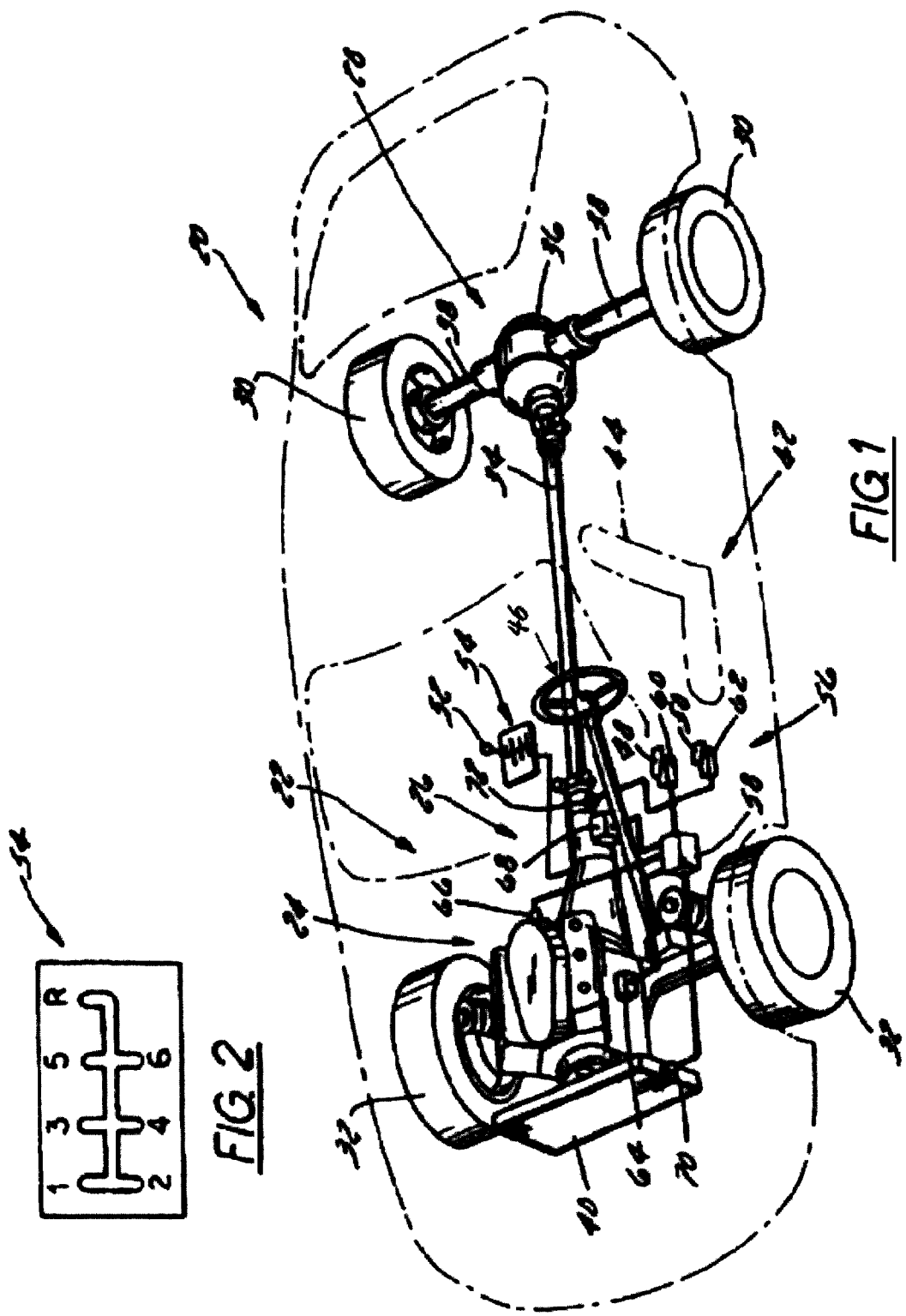

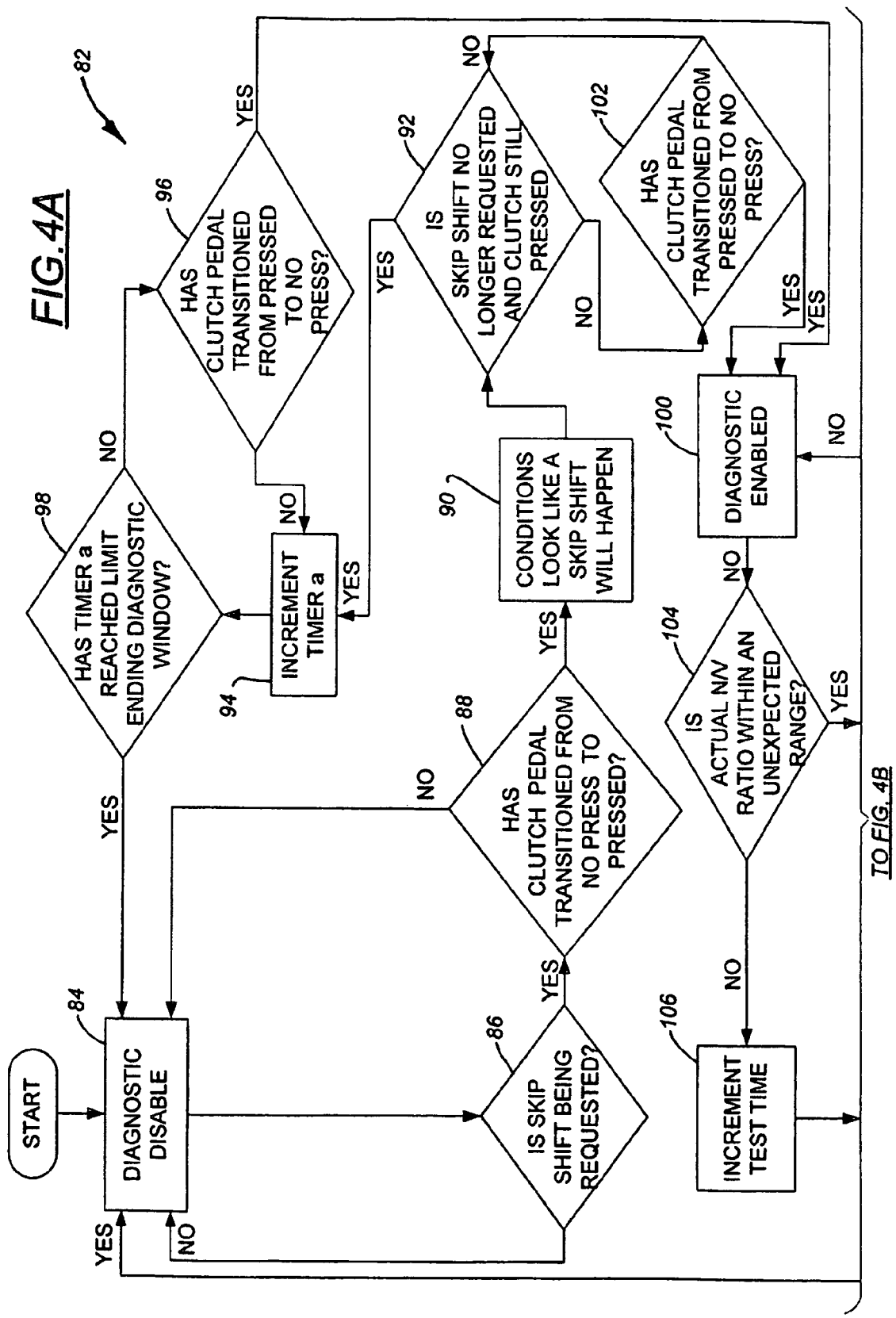

METHOD FOR DETECTING THE PERFORMANCE OF A SKIP SHIFT DEVICE

FIELD

The present invention relates to motor vehicles equipped with a manual transmission and more particular to motor vehicles equipped with a skip shift device that is activated to prevent shifting into one or more certain gears of the manual transmission under non-aggressive driving conditions.

BACKGROUND

High performance sports cars and other high performance vehicles equipped with relatively powerful, higher horsepower engines tend to sacrifice fuel economy for performance. Though it may seem counterintuitive, since the engines and manual transmissions of these vehicles are configured for performance, less than aggressive operation can significantly reduce fuel economy. To prevent such a reduction in fuel economy and to meet state and federal fuel economy and emissions regulations, vehicle manufacturers have implemented electronic shift control systems, such as those disclosed in U.S. Pat. Nos. 5,809,835 and 6,145,398, where vehicle operation is monitored and the driver is prevented from manually shifting into one or more gears that would undesirably further reduce fuel economy or otherwise impair engine performance.

One known type of electronic shift control system includes an electronic controller that monitors engine operation and driver input in a six-gear, high performance car and activates a skip shift device, typically a solenoid, that cooperates with a shift-gate and/or gear shift lever of the car's manual transmission during a skip shift so that the driver can only up-shift from first gear into a gear other than second gear when driving non-aggressively. For example, in one know skip shift implementation, the driver is prevented from up-shifting from first gear into second gear during a skip shift. In another implementation, the driver is prevented from up-shifting into second gear and third gear.

When the car begins moving in first gear, the controller of the electronic shift control system monitors engine speed, vehicle speed, manifold absolute pressure (MAP), gas pedal position and other parameters to determine whether the driver is driving non-aggressively enough such that activation of the skip shift device is required to cause a skip shift to occur. When such a skip shift occurs, the driver is locked out of shifting into at least one gear, typically second gear, such that the driver must up-shift into some other higher gear. Doing so helps maximize fuel economy and reduces emissions by preventing excessive engine revolutions that would have occurred if the driver would have been permitted to shift into the locked out gear.

In one known skip shift implementation, called computer assisted gear selection, the skip shift device is a solenoid that is energized when the car is in first gear, the throttle is at or below a certain percentage of wide open throttle, the car is traveling at a relatively low speed that falls within a predetermined non-aggressive driving range, and the temperature of the engine coolant is above a preset temperature. For example, in one known implementation, the controller will energize the skip shift solenoid when the throttle is at 35% or less, the car is traveling at a speed of between about 15 mph and about 20 mph, and the temperature of the engine coolant is greater than about 170° Fahrenheit. In another known implementation, throttle position can be no greater than about 25% or 26%. At such non-aggressive driving conditions, energization of the skip shift solenoid under this system allows the driver to shift out of first gear but prevents the driver from shifting into second gear to improve fuel efficiency. As previously mentioned, depending on the system configuration, the driver can be prevented from up-shifting from first gear into second gear and third gear.

Other parameters can also be used in addition to or in place of the aforementioned to determine when to request a skip shift. For example, in at least one other known implementation, gas pedal position or a percentage thereof can be used along with one or more of the aforementioned parameters in determining when the controller will request a skip shift. Where MAP is used, it can be adjusted to compensate for changes in barometric pressure. Finally, while specific percentages, speeds and temperatures are listed in the preceding paragraph, it should be recognized that extensive testing and experimentation is done to calibrate each parameter used to determine when a skip shift is requested based on the particular characteristics of the vehicle including, e.g. engine displacement, transmission, weight, traction, etc. in which the skip shift is implemented.

While such electronic shift control systems have worked well at maximizing fuel economy and minimizing emissions during non-aggressive driving conditions, the skip shift solenoid must be monitored to ensure it is working properly. To do so, a diagnostic is used to monitor skip shift solenoid operation and an On-Board Diagnostic Computer code (OBDC2) is generated should failure be detected. Depending on the configuration of the controller, generation of a skip shift failure OBDC2 code causes a check engine or other indicator to be displayed to the driver. In addition, this can cause the controller to stop energizing the skip shift solenoid during non-aggressive driving conditions. Unfortunately, such a diagnostic has been known to generate a skip shift solenoid failure OBDC2 code when there is no such failure. Conversely, there also have been occurrences where the skip shift solenoid has failed without any OBDC2 code being generated. As a result, this can lead the owner of the high performance vehicle to incur unnecessary diagnostic expenses and reduced fuel economy.

What is needed is a better diagnostic that more accurately and reliably determines when a skip shift device has actually failed. What is also needed is a more robust diagnostic that minimizes and preferably prevents the occurrence of false failures.

SUMMARY

The present invention is directed to a method for detecting performance of a skip shift device in a vehicle equipped with an engine and manual transmission in determining when to enable execution of a diagnostic of the skip shift device particularly where the clutch has remained engaged long after a controller of an electronic shift control system that controls operation of the skip shift device has requested a skip shift be performed. Where a skip shift has been requested and the clutch engaged, the method disables or prevents execution of the skip shift diagnostic where the skip shift ceases to be requested and the clutch does not become disengaged in a predetermined period of time, and enables execution of the skip shift diagnostic where the skip shift ceases to be requested and clutch is disengaged within the predetermined period of time. Where the skip shift remains requested and the clutch is engaged, the method enables execution of the skip shift diagnostic when the clutch is disengaged. If the clutch remains engaged, the method returns to monitor whether the skip shift ceases to be requested while the clutch is engaged.

In a preferred implementation, a first timed loop is executed that monitors for a predetermined period of time whether the clutch becomes disengaged where the skip shift ceases to be requested while the clutch pedal. Should the loop time out before the clutch is disengaged, execution of the skip shift diagnostic is disabled. Should the clutch be disengaged before the loop times out, execution of the skip shift diagnostic is enabled. The loop times out when a sufficient amount of time elapses where continued engagement of the clutch necessitates disabling execution of the skip shift diagnostic so that the method can be re-initialized to monitor whether or when a skip shift is once again requested.

When the skip shift diagnostic is enabled, it checks to see whether the transmission has been manually shifted into an unacceptable gear where a skip shift was requested, increments a skip shift diagnostic test time variable if it was shifted into an acceptable gear, and increments a skip shift fail variable if it was shifted into an unacceptable gear. In one implementation, the actual ratio of engine speed (N) to vehicle speed (V) is determined after beginning execution of the skip shift diagnostic and compared with an N/V range indicative of the transmission being shifted into an unacceptable gear. In one preferred implementation where the transmission is a six speed transmission, the skip shift diagnostic compares the actual N/V ratio with the undesirable or unexpected N/V range indicative of the vehicle having been manually up-shifted from first gear into an unacceptable gear. For example, in one such implementation, actual N/V ratio is compared with the undesirable or unexpected N/V ratio that would be achieved where the vehicle was up-shifted from first gear into second gear to determine whether second gear was avoided during the skip shift.

Where the skip shift fail variable reaches or exceeds a predetermined skip shift failure threshold, a fault code, such as an OBDC2 code, is set to indicate failed skip shift device operation and skip shift diagnostic can be ended. Where the skip shift diagnostic test time variable has been incremented and the clutch engaged, execution of the skip shift diagnostic is disabled and the method re-started. In addition, the skip shift diagnostic can also be disabled where a second timing loop incorporating the skip shift diagnostic test time variable reaches a predetermined time limit.

In a preferred embodiment, the skip shift device is a solenoid that is energized by the controller of the electronic shift control system when non-aggressive driving conditions are detected causing a skip shift to be requested. In a preferred embodiment, engagement of the clutch is detected by monitoring the driver pressing and releasing of a clutch pedal of the manual transmission. Clutch engagement and disengagement monitoring can be done using a sensor, such as a clutch up-stop switch, that is linked to the controller.

It is an object of the present invention to provide an improved skip shift device diagnostic method that is more robust and better assesses skip shift device performance.

It is an object of the present invention to provide an improved skip shift device diagnostic method that more accurately and more reliably determines when to enable execution of a skip shift diagnostic.

It is an additional object of the present invention to provide an improved skip shift device diagnostic method that better accommodates extended engagement of the clutch after a skip shift has been requested.

It is a further object of the present invention to more accurately determine when execution of the skip shift diagnostic should be enabled where a requested skip shift ceases to be requested while the clutch is engaged.

It is another object of the present invention to more reliably determine how to monitor when a skip shift has been requested and the clutch remains engaged for an extended period of time in determining when to enable execution of a skip shift diagnostic.

It is a still additional object of the present of invention to reduce or prevent instances where a false failure of the skip shift device is indicated by a skip shift diagnostic.

It is therefore a further object of the present invention to reduce or prevent instances where the skip shift diagnostic improperly passes the skip shift device.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

DESCRIPTION OF THE DRAWINGS

Preferred exemplary embodiments of the invention are illustrated in the accompanying drawings in which like reference numerals represent like parts throughout, and in which:

FIG. 1 is a perspective view of an automotive vehicle with its body shown in phantom to illustrate an electronic shift control system for a manual transmission;

FIG. 2 is a top plan view of an exemplary six speed shift pattern;

FIGS. 4A & 4B illustrate a flowchart of a skip shift diagnostic execution method in accordance with the invention used to more accurately and reliably ascertain skip shift device operation success and failure.

Figure 3:
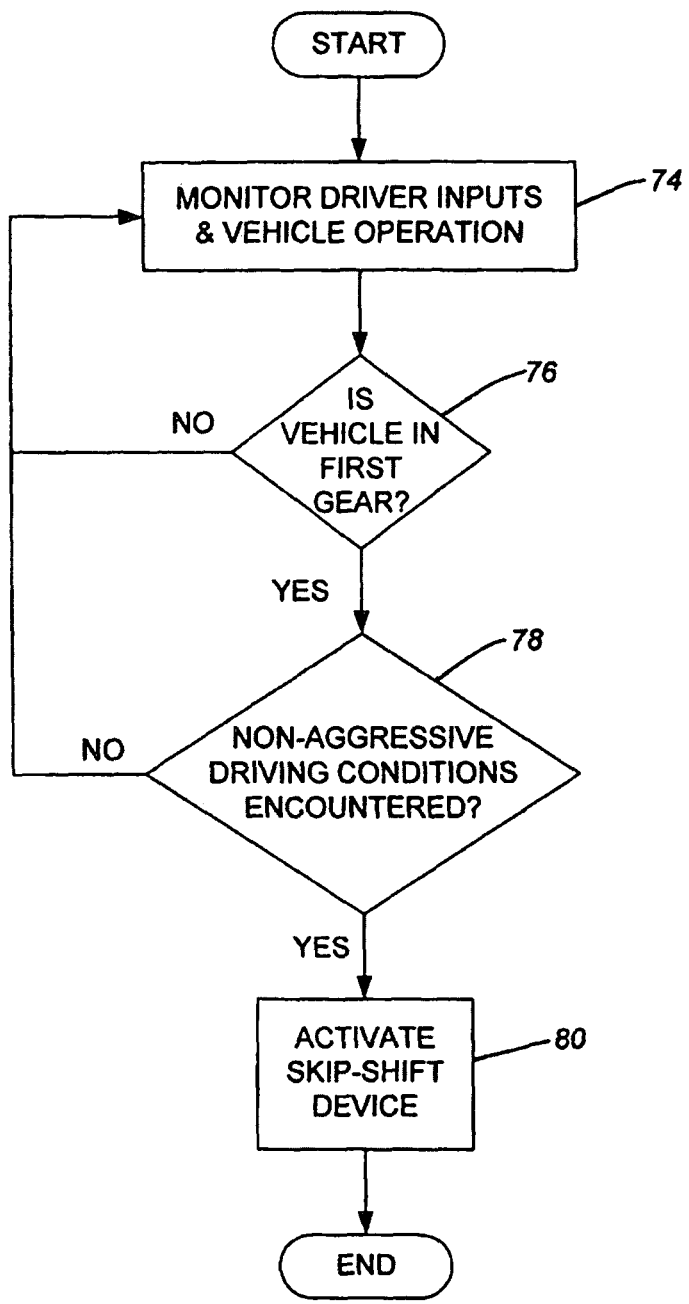
FIG. 3 is a flowchart of a skip shift device activation method using such an electronic shift control system illustrated in FIG. 1.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIG. 1 illustrates a motor vehicle 20 that has a powertrain 22 that includes an internal combustion engine 24 and manual transmission 26 coupled by a driveline 28 to a pair of rear wheels 30 and which can also be coupled to a pair of front wheels 32. The driveline 28 includes a drive shaft 34, rear differential 36 and a pair of driven rear axles 38 linked to the rear wheels 30. Engine cooling is provided by a radiator 40. The vehicle 20 also has a passenger compartment 42 that contains a vehicle seat 44 (shown in phantom) on which a driver (not shown) of the vehicle 20 can sit. The vehicle 20 also has driver inputs that include a steering wheel 46, a gas pedal 48, a clutch pedal 50 and a gear shift lever 52. FIG. 2 depicts a six-speed shift pattern 54 that corresponds to a six gear shift gate (not shown) of a six speed transmission 26 along which the gear shift lever 52 is constrained to move during shifting. Although the transmission 26 is shown in FIG. 1 as being coupled directly to the engine 24, it can be coupled to or otherwise located in place of the rear differential 36.

The vehicle 20 also includes an electronic shift control system 56 that is configured to monitor vehicle operation, driver input, and provide gear selection oversight in a manner that optimizes engine operation. The electronic shift control system 56 includes a controller 58, such as powertrain control module or transmission control module, which is linked to a throttle position sensor 60 used to monitor throttle position by monitoring the position of the gas pedal 48, a clutch pedal sensor 62, e.g. clutch up-stop switch, used to monitor driver engagement of the clutch pedal 50, an engine speed sensor 64, a manifold absolute pressure (MAP) sensor 66, a sensor 68 from which the gear or gear shift lever position can be determined, and at least one other sensor or the like (not shown) from which vehicle speed can be determined. If desired, the controller 58 can also be linked to a coolant temperature sensor 70. Where MAP is used, it can be compensated for changes in barometric pressure, such as what can occur when the vehicle 20 operates at different altitudes and at varying atmospheric conditions. If desired, measurements or data from a mass flow sensor (not shown) can also be used in addition to or in place of MAP sensor 66 to provide a mass flow ratio or the like. The controller 58 is also linked to a transmission skip shift device 72, such as a solenoid, which is energized by the controller 58 to lock the driver out from being able to shift into one or more gears of the transmission 26 when driver inputs and engine operating conditions dictate. In at least one preferred embodiment, such an electronic shift control system 20, using one or more of these and other sensors, can be implemented in accordance with the electronically controlled manual transmission shift system disclosed in U.S. Pat. No. 6,145,398, the disclosure of which is hereby incorporated by reference herein.

With reference to the skip shift device activation method 73 depicted in FIG. 3, during operation of the vehicle 20 shown in FIG. 1 that is equipped with a six speed manual transmission 26, the controller 58 is configured, such as via firmware or software, to monitor data from one or more of sensors 60, 64, 66, 68, and 70 along with vehicle speed in step 74. If it is determined that the vehicle 20 is in first gear in step 76 and the non-aggressive driving conditions are detected in step 78 using the aforementioned data, the skip shift device 72 is activated in step 80. In one method implementation, the skip shift device 72 is activated in step 80 when the vehicle 20 is in first gear and it is determined in step 78 as a result of monitoring 74 that the throttle is between 25% and 35% of wide open throttle or gas pedal position, the vehicle is traveling at a speed of between 15 mph and 20 mph, and coolant temperature is at or above about 170° Fahrenheit. In another such exemplary skip shift device activation method implementation, engine speed and load are monitored, such as by monitoring map pressure, pedal position and other engine operating variables, during step 74. Routine vehicle testing and experimentation, e.g. calibration, can be used for each parameter to set their acceptable value or range for use by the controller 58 in determining when to request a skip shift. The skip shift device 72 is activated if the vehicle 20 is in first gear 76 and the variables being monitored are indicative of the driver driving the vehicle 20 non-aggressively.

Where the skip shift device 72 is a solenoid, activation of the skip shift solenoid 72 is done by the controller 58 energizing the solenoid 72. When the controller 58 energizes the skip shift solenoid 72, it extends a plunger (not shown) of the solenoid 72 that latches down the shift gate thereby preventing the driver from up-shifting the gear shift lever from first gear into at least second gear. As a result, the driver can only move the gear shift lever into a gear above the gear or gears intended to be locked out by the skip shift. Latching down the shift gate in this manner prevents up-shifting into at least second gear, which in turn prevents the revving or over-revving of the engine and excessive fuel consumption that would otherwise occur during non-aggressive driving. As a result, fuel economy is maximized and emissions are minimized.

While use of such skip shift solenoid activation methods help vehicle manufacturers to comply with state and federal fuel economy and emissions regulations, monitoring proper operation of the skip shift solenoid 72 is also required by such regulations. Such monitoring is needed because there are a number of things, such as dirt, debris, a short circuit, conditions which may cause the shift gate latch to become lodged in a partially opened or closed position, a physically broken shift gate or the like, which can cause the signal from the controller 58 that would ordinarily properly energize the solenoid 72 and cause the skip shift to be successfully carried out to fail to do so. While prior skip shift diagnostics have previously been implemented in an attempt to determine when such a condition occurs, they have not always been accurate or reliable all of the time. As a result, there has been a need for an improved skip shift diagnostic that provides a more accurate and reliable assessment of skip shift solenoid operation particularly for the case where prolonged clutch pedal engagement has occurred.

Figure 4B:
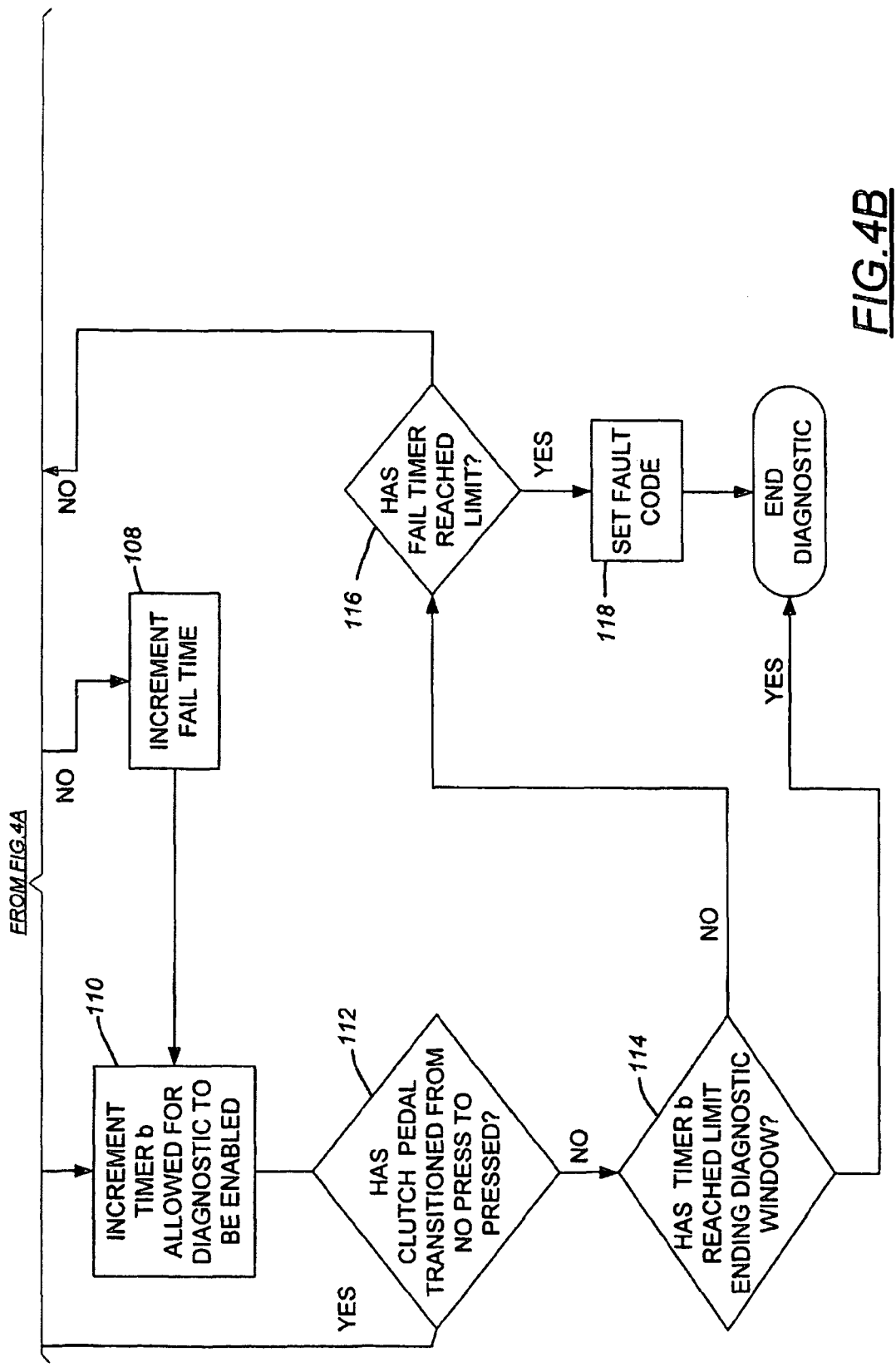

FIGS. 4A and 4B present a flowchart of a skip shift diagnostic execution method 82 in accordance with the present invention that better assesses performance of the skip shift solenoid 72 through monitoring of at least one driver input that includes clutch pedal engagement, analysis of engine operation, and execution of a skip shift diagnostic. The purpose of the skip shift diagnostic execution method 82 is to monitor operation of the skip shift solenoid 72 and accurately and reliably determine if it has failed so that a corresponding OBDC2 code can be generated in compliance with fuel economy and emissions regulations. The skip shift diagnostic execution method 82 advantageously provides increased accuracy by monitoring shift control system operation along with clutch pedal engagement to determine when to actually execute a skip shift diagnostic 100 that checks whether the skip shift solenoid 72 is operating properly.

In the beginning and with reference to FIG. 4A, the skip shift diagnostic is in a disabled state 84 until enabled in step 100 resulting from execution of one or more skip shift diagnostic enablement steps 86-98 and 102 causing enablement to occur. In determining whether to enable the skip shift diagnostic 100, the controller 58 of the electronic control system 56 is monitored until a skip shift is requested in step 86 by the controller 58. As previously discussed, a skip shift is requested by the controller 58 when the aforementioned non-aggressive driving conditions are detected using data from one or more of sensors 48-70 when the vehicle 20 is in first gear such that the controller 58 will cause the skip shift solenoid 72 to be energized in anticipation of an up-shift. If no skip shift is requested in step 86, the skip shift diagnostic 100 is not run such that it is put in a disabled state 84.

However, if a skip shift has been requested in step 86, a query is made in step 88 as to whether the clutch pedal 50 has been engaged by the driver pressing on it. For example, the controller 58 can monitor the position of the clutch pedal 50 via the clutch pedal sensor 62, e.g. clutch up-stop switch. If the clutch pedal sensor 62 monitored by the controller 58 does not indicate that the clutch pedal 50 has transitioned from not being pressed to being pressed in step 88, it means that the driver has no intent of actually up-shifting out of first gear. If this happens, the skip shift diagnostic is not run such that it is put in a disabled state 84.

Should the clutch pedal 50 have transitioned from not previously being pressed to having been pressed by the driver, it appears that the conditions are set for a skip shift to happen 90. At that point, the skip shift diagnostic execution method 82 queries in step 92 whether the skip shift is still being requested while continuing to monitor whether the clutch pedal 50 is still engaged. If the skip shift is no longer being requested in step 92 but the clutch pedal 50 is still depressed, the skip shift diagnostic execution method 82 increments a timer, TIMER a, in step 94 of a loop that monitors in step 96 whether the clutch pedal 50 has been released until the loop times out in step 98. When TIMER a reaches a predetermined time limit, the loop times out, and the skip shift diagnostic execution method 82 returns to its disabled state 84. This typically occurs when the driver continues to hold down the clutch pedal 50 long after the operating conditions that caused a skip shift request to be made are no longer met. This can occur, for example, where a driver becomes aware of a skip shift request made by the controller 58, such as where an indication of the skip shift appears on the dashboard of the vehicle 20, and holds down the clutch pedal 50 long enough to cause the vehicle 20 to coast until vehicle speed drops below the skip shift threshold causing the skip shift request to be dropped. So that this is detected, the predetermined time limit for TIMER a is selected to ensure that there is no need to enable the diagnostic because the driver will have coasted with the clutch engaged that there is no possibility that the skip shift could have been carried out.

If the clutch pedal 50 is released before the loop times out, step 96 causes the diagnostic to be enabled in step 100. This advantageously triggers enablement of the diagnostic 100 in order to determine whether the initial skip shift request was actually fulfilled or not even though the clutch pedal 50 may have remained pressed for a long time. Therefore, the monitoring loop and decision step 96 advantageously increases skip shift diagnostic accuracy and reliability by ensuring the skip shift diagnostic 100 is enabled only when needed.

Referring once again to step 92, if the skip shift is still requested and the clutch pedal 50 is no longer still being pressed, the skip shift diagnostic execution method 82 checks in step 102 whether the clutch pedal 50 transitioned from being pressed to being released. If that has occurred, the skip shift diagnostic is also enabled in step 100, enabling the diagnostic to check whether the shift that was made was into an acceptable gear thereby also enabling a determination of proper skip shift solenoid operation to be made. Otherwise, if the query in step 102 is not satisfied, step 92 is executed again. These checks are made until either the skip shift is no longer requested or the clutch pedal 50 is released. As previously discussed, if the skip shift is no longer being requested, the loop of steps 94, 96 and 98 is then executed. Of course, if the clutch pedal 50 is released, the skip shift diagnostic is enabled 100.

When the skip diagnostic is enabled 100, a ratio of engine speed (N) versus vehicle speed (V) is determined and compared in step 104 to an undesirable or unexpected range of N/V for the particular vehicle 20 that would be expected if the skip shift had not been properly executed. More specifically, actual N/V is determined and compared in step 104 to see if it falls outside or not in the unexpected N/V range indicating that a successful skip shift has occurred or whether it falls within this range indicating that the vehicle had been shifted into an unacceptable gear. For example, where execution of a skip shift is intended to cause at least the second gear to be skipped during an up-shift out of first gear, the undesirable or unexpected N/V range is one in which vehicle operation would produce if the vehicle was up-shifted into second gear. Where execution of the skip shift is intended to cause the second and third gear to be skipped, the undesirable or unexpected N/V range is one in which vehicle operation would produce if the vehicle was up-shifted into second or third gear. However, for purposes of discussion below, it will be assumed that execution of a skip shift is intended to avoid up-shifting from first gear into second gear but it should be recognized that a skip shift can prevent a driver from shifting into other gears as well. The electronic shift control system 56 can obtain engine speed (N) using engine speed sensor 64 or another sensor from which engine drive shaft speed or the like can be obtained. Vehicle speed (V) can be obtained using a speedometer or another vehicle speed sensor onboard the vehicle 20 that is inputted into the controller 58 of the electronic shift control system 56.

If the actual N/V ratio falls outside the undesirable or unexpected range where the driver up-shifted into a gear above second gear such that it indicates proper operation of the skip shift solenoid 72, a skip shift diagnostic test time counter is incremented in step 106, indicating all conditions for the skip shift have been successfully met. Otherwise, as is shown in FIG. 6B, if the actual N/V ratio falls within the undesirable or unexpected range, a fail time counter is incremented in step 108, indicating a skip shift failure has occurred. As previously discussed, such a failure can occur when the skip shift solenoid 72 has failed, the shift gate latch has become stuck in a partially opened or closed position, the shift gate has become broken, dirt or debris is interfering with skip shift solenoid 72, shift gate, or latch operation, etc.

If desired and where the electronic shift control system 56 is so equipped, gear or gear shift lever position sensor 68 can be used instead of N/V ratio in comparison step 104 to determine whether the driver has up-shifted into an acceptable gear in completion of a successful skip shift. In this case, comparison step 104 compares the actual gear or gear shift lever position with that of the expected position in determining whether to increment the test time counter 106 or the fail time counter 108.

With continued reference to FIG. 4B, these skip shift diagnostic steps are part of a second timed loop where a timer, TIMER b, is incremented in step 110. The timer, TIMER b, is used in the loop to define a skip shift diagnostic execution window for a certain limited period of time in order to limit the amount of time given in which to increment the test time variable or the fail time counter to better ensure accurate failing of the skip shift solenoid 72. During its execution, the controller 58 monitors whether the clutch pedal 50 has been pressed in step 112. If the clutch pedal 50 has been pressed before the loop times out, then the skip shift diagnostic is disabled in step 84. Where the skip shift has been successful, pressing the clutch pedal 50 to make another shift disables the diagnostic because it may be invalid as driver intent for pressing the clutch pedal 50 may be unclear. For example, this can occur where a driver has put the vehicle into neutral and coasted such that the actual N/V ratio is indicative of a unsuccessful skip shift but the vehicle is not in gear. In this case, the diagnostic branches to the diagnostic disabled step 84 re-starting the skip shift diagnostic execution method 82 and avoiding falsely failing the skip shift solenoid 72. Preventing such a false failure advantageously makes the method of the invention more robust by ensuring that such conditions will not cause any fault code to be set nor any "Check Engine" light to be displayed. Where the skip shift was not successful, pressing the clutch pedal 50 also causes this loop to branch to the diagnostic disabled step 84 so the skip shift diagnostic execution method 82 is ready should a skip shift be requested.

However, if the clutch pedal 50 has not been pressed in step 112 then the timer, TIMER b, is checked in step 114 to see whether the time limit for the loop has been reached ending the skip shift diagnostic execution window. If TIMER b has reached the predetermined time limit in step 114, the skip shift diagnostic is ended. In another implementation, if desired, the diagnostic need not be ended but can be returned to the diagnostic disabled step 84.

If the time limit has not been reached in step 114, a check is made in step 116 to determine whether the fail time counter has reached a predetermined skip shift failure limit. If the fail time counter has not reached the predetermined skip shift failure limit, the diagnostic is once again enabled in step 100. Thereafter, the actual N/V ratio is determined and compared with the undesirable or unexpected range, the pass time counter or fail time counter is incremented, and the aforementioned loop is executed until either TIMER b times out or the clutch pedal 50 is pressed.

Should the fail time counter reach the predetermined skip shift failure limit, an OBDC2 fault code is set in step 118 that indicates for sure there has been multiple skip shift failures. Setting of the fault code in step 118 is stored in memory of the controller 58 and/or another location where it can be read by an automotive technician using a diagnostic code reader. In one implementation, setting of the fault code in step 118 also causes a "Check Engine" light or the like to light up on the dashboard to provide a warning to the driver that servicing of the vehicle 20 is needed. In one implementation, the fault code is set in step 118 when there have been a plurality of skip shift solenoid failures detected. In another implementation, the fault code is set in step 118 when a plurality of pairs, i.e. three or more, of skip shift failures have been detected. After that, the diagnostic can be ended or returned to the disabled state in step 84.

Although the skip shift device activation method 73 and the skip shift diagnostic execution method 82 can be executed by another device, each method preferably is executed by the controller 58 of the electronic shift control system 56. Such a controller 58 preferably includes a processor, such as a microcontroller or microprocessor, memory or other data storage that is accessible by the processor, and can include one or more circuit boards and associated circuitry. At least portions of each method 73 and 82 are configured in firmware or software in a manner that is executable by the processor of the controller 58.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A method for detecting performance of a skip shift device in a vehicle comprising:
    (a) providing an engine, a manual transmission having at least a plurality of pairs of gears, an electronic shift control system that includes a controller, a plurality of sensors that monitor engine operation and driver input linked to the controller, and a skip shift device that prevents a driver of the vehicle from shifting into at least one other gear of the manual transmission than the current gear when the skip shift device is activated by the controller;
    (b) monitoring whether a skip shift has been requested; and
    (c)(i) monitoring for a period of time for disengagement of the clutch where the skip shift was requested in step (b) and the clutch has been engaged but where the skip shift is now no longer being requested, (ii) enabling execution of a skip shift diagnostic if the clutch is disengaged before expiration of the period of time, and (iii) disabling execution of the skip shift diagnostic if the clutch is not disengaged before expiration of the period of time.

2. The method of claim 1 comprising the further step of monitoring for disengagement of the clutch where the skip shift was requested in step (b) and the clutch is engaged and enabling execution of the skip shift diagnostic when the clutch is disengaged.

3. The method of claim 2 wherein the time period is a predetermined period of time and a counter is used to keep track of whether the predetermined period of time has elapsed in step (c).

4. The method of claim 2 wherein the skip shift diagnostic assesses whether the skip shift device has properly worked when a skip shift is requested and the skip shift device is activated.

5. The method of claim 4 wherein the skip shift device comprises a solenoid that is activated by being energized by the controller.

6. The method of claim 2 wherein execution of the skip shift diagnostic comprises the following steps:
    (1) determining whether the vehicle has been shifted into an acceptable gear in response to activation of the skip shift device resulting from the skip shift request;
    (2) incrementing a skip shift fail timer counter if the vehicle has not been shifted into an acceptable gear; and
    (3) setting a fault code if the skip shift fail timer counter exceeds a predetermined threshold.

7. The method of claim 6 comprising the further step of returning the skip shift diagnostic to a disabled state if the vehicle has been shifted into an acceptable gear in step (1).

8. The method of claim 7 wherein the skip shift diagnostic is returned to the disabled state after the clutch has transitioned from a disengaged state to an engaged state.

9. The method of claim 8 wherein the position of the clutch pedal is monitored by the controller to determine whether the clutch pedal is depressed by the driver in determining whether the clutch has transitioned from a disengaged state to an engaged state.

10. The method of claim 9 wherein one of the plurality of sensors comprises a switch linked to the controller that is used to detect when the clutch pedal is depressed.

11. The method of claim 6 wherein in step (1) an actual ratio of engine speed (N) divided by vehicle speed (V) is compared to an undesirable or unexpected N/V range in determining whether the vehicle has been shifted into an acceptable gear.

12. The method of claim 11 wherein in step (1) it is determined that the vehicle has been shifted into an acceptable gear if the actual N/V range falls outside of the undesirable or unexpected N/V range.

13. The method of claim 12 wherein the manual transmission comprises a six speed manual transmission and wherein in step (1) the determination whether the actual N/V range falls within the expected N/V range is used to determine whether the vehicle has been up-shifted from first gear into a gear other than second gear.

14. A method for detecting performance of a skip shift solenoid in a vehicle comprising:
  (a) providing an engine, a six speed manual transmission, and an electronic shift control system that includes a controller, a plurality of sensors that monitor engine operation and driver input, and a skip shift solenoid used during a skip shift requested by the controller to prevent a driver of the vehicle from up-shifting from first gear into second gear;
  (b) monitoring whether the controller has requested a skip shift;
  (c) determining whether a clutch of the transmission has transitioned being disengaged to being engaged when a skip shift has been requested;
  (d) determining whether the skip shift continues to remain requested while the clutch is engaged;
  (e) monitoring whether the clutch becomes disengaged if the skip shift continues to remain requested while the clutch is engaged in step (d) and enabling execution of a skip shift diagnostic when the clutch becomes disengaged; and
  (f) monitoring for a period of time whether the clutch becomes disengaged if the skip shift is no longer requested when the clutch is engaged in step (d) and one of (i) disabling execution of the skip shift diagnostic if the clutch does not become disengaged before the period of time elapses, and (ii) enabling execution of the skip shift diagnostic if the clutch becomes disengaged before the period of time elapses.

15. The method of claim 14 wherein one or more of steps (b), (c), (d), (e), (f) and (g) are repeated.

16. The method of claim 14 wherein the skip shift diagnostic assesses whether the skip shift solenoid has properly worked when a skip shift is requested and the skip shift solenoid is energized by the controller.

17. The method of claim 14 wherein skip shift diagnostic comprises:
  (1) determining whether the vehicle has been manually up-shifted from first gear into an acceptable gear other than second gear in response to activation of the skip shift device resulting from the skip shift request;
  (2) incrementing a skip shift fail timer counter if the vehicle has not been shifted into an acceptable gear; and
  (3) setting a fault code if the skip shift fail timer counter exceeds a predetermined threshold.

18. The method of claim 17 comprising the further step of returning the skip shift diagnostic to a disabled state if the vehicle has been shifted into an acceptable gear in step (1).

19. The method of claim 17 wherein in step (1) an actual ratio of engine speed (N) divided by vehicle speed (V) is compared to an undesirable or unexpected N/V range in determining whether the vehicle has been shifted into an acceptable gear.

20. The method of claim 19 wherein in step (1) it is determined that the vehicle has been shifted into an acceptable gear if the actual N/V range falls outside the undesirable or unexpected N/V range.

21. A method for detecting performance of a skip shift solenoid in a vehicle comprising:
  (a) providing an engine, a six speed manual transmission, and an electronic shift control system that includes a controller, a plurality of sensors that monitor engine operation and driver input, and a skip shift solenoid used during a skip shift requested by the controller to prevent a driver of the vehicle from up-shifting from first gear into second gear;
  (b) monitoring whether the controller has requested a skip shift;
  (c) determining whether a clutch of the transmission has transitioned being disengaged to being engaged;
  (d) determining whether the skip shift continues to remain requested while the clutch is engaged;
  (e) monitoring when the clutch becomes disengaged for a predetermined period of time should the skip shift no longer be requested while the clutch is engaged in step (d) and (i) disabling a skip shift device diagnostic should the predetermined period of time expire, or (ii) enabling execution of the skip shift device diagnostic should the clutch become disengaged before expiration of the predetermined period of time;
  (f) monitoring when the clutch becomes disengaged should the skip shift no longer be requested while the clutch is engaged in step (d) and (i) executing step (d) and (e) or (f) if the clutch has not become disengaged, or (ii) enabling execution of the skip shift device diagnostic should the clutch become disengaged; and
  (g) executing the skip shift diagnostic to determine whether a successful skip shift has been executed where the vehicle has been up-shifted out of first gear without being shifted into second gear.

* * * * *